United States Patent
Zhang

(10) Patent No.: US 8,009,983 B2
(45) Date of Patent: Aug. 30, 2011

(54) HIGH LOSS LOOP BACK FOR LONG REPEATER SPAN

(75) Inventor: Hongbin Zhang, Marlboro, NJ (US)

(73) Assignee: Tyco Electronics Subsea Communications LLC, Morristown, NJ (US)

(*) Notice: Subject to any disclaimer, the term of this patent is extended or adjusted under 35 U.S.C. 154(b) by 506 days.

(21) Appl. No.: 12/146,811

(22) Filed: Jun. 26, 2008

(65) Prior Publication Data

US 2009/0324249 A1     Dec. 31, 2009

(51) Int. Cl.
*H04B 10/08* (2006.01)
*H04B 17/00* (2006.01)

(52) U.S. Cl. .......... 398/37; 398/10; 398/11; 398/13; 398/16; 398/17; 398/18; 398/20; 398/25; 398/30; 398/31; 398/32; 398/33

(58) Field of Classification Search .............. None
See application file for complete search history.

(56) References Cited

U.S. PATENT DOCUMENTS

| | | | | |
|---|---|---|---|---|
| 5,673,129 A | * | 9/1997 | Mizrahi | ............ 398/95 |
| 5,825,520 A | * | 10/1998 | Huber | ............ 398/87 |
| 6,256,428 B1 | | 7/2001 | Norwood et al. | |
| 6,301,036 B1 | | 10/2001 | Spencer | |
| 7,388,657 B2 | | 6/2008 | Abbott | |
| 2002/0131099 A1 | * | 9/2002 | Harasawa | ............ 359/110 |
| 2002/0131696 A1 | | 9/2002 | Yokoyama et al. | |
| 2003/0206688 A1 | * | 11/2003 | Hollars et al. | ............ 385/24 |
| 2005/0226614 A1 | * | 10/2005 | Ogiwara et al. | ............ 398/37 |

OTHER PUBLICATIONS

International Search Report and Written Opinion dated Aug. 18, 2009 issued in related International Patent Application No. PCT/US09/48398.
Jensen, et al., "New Technology for Operating and Maintaining SL200 Systems," Suboptics, 1993, pp. 523-526.
Jensen, et al., "Novel Technique for monitoring long-haul undersea optical-amplifier systems," OFC '94, Paper ThR3 (1994) pp. 256-257.
Cornwell, "In-Service Line Performance Monitoring with COTDR," Poster We 15.2, article, undated. (3 pages).

* cited by examiner

*Primary Examiner* — Ken N Vanderpuye
*Assistant Examiner* — Darren E Wolf
(74) *Attorney, Agent, or Firm* — Grossman, Tucker, Perreault & Pfleger, PLLC

(57) ABSTRACT

Various high loss loop back (HLLB) repeater architectures are disclosed that enable selectively monitoring (e.g., measuring, analyzing, etc) of Rayleigh signals from both inbound and outbound directions of an optical communication system. In one such embodiment, first and second optical test signal frequencies (or ranges) are used, in conjunction with selective filtering, for monitoring the outbound and inbound paths, respectively. The repeater architectures allow optical time domain reflectometry (OTDR) monitoring techniques to be employed, for example, in particularly long repeater spans, such as those in excess of 90 km in length.

20 Claims, 13 Drawing Sheets

HIGH LOSS LOOP BACK FOR LONG REPEATER SPAN

RELATED APPLICATION

The present application is related to U.S. application Ser. No. 12/029,151, filed Feb. 11, 2008, and titled "System and Method for Fault Identification in Optical Communication Systems", which is incorporated herein in its entirety by reference.

TECHNICAL FIELD

The present application relates to communication systems and, more particularly, to fault identification in optical communication systems.

BACKGROUND

In long distance optical communication systems it may be important to monitor the health of the system. For example, monitoring can be used to detect faults or breaks in the optical transmission cable, faulty repeaters or amplifiers, or other problems with the system. Known monitoring methods include use of optical time domain reflectometry (OTDR) equipment and techniques.

In more detail, and according to conventional OTDR techniques, an OTDR signal source generates a test or probe signal, such as an optical pulse or a specially modulated optical carrier, and the test signal is launched into the outbound optical path of a path pair. Elements in the outbound path may reflect (e.g., backscatter) portions of the OTDR test signal. The backscattered signal portions may be returned (e.g., on the same outbound path or a different path such as the inbound path) and detected in an OTDR receiver. The transmission characteristics of each element in the path may also affect the amount of signal reflected at points after that element, for example, by attenuating the test signal or the reflected signal. The magnitude of the backscattered or reflected signal from each element or point along the optical path may be used as a metric for characterizing the optical path. Coherent optical time domain reflectometry (COTDR) is an enhancement of OTDR and may be used in long-haul WDM systems such as undersea optical communication systems. COTDR uses a special optical modulation scheme for its test signal and a coherent optical detection receiver to improve receiver sensitivity. The improved sensitivity enables measurement of very low levels of backscattered signal and thus the examination of very long optical fibers even if the fibers are in portions of the optical path far from the COTDR equipment (e.g., beyond an optical amplifier). Because Rayleigh backscatter from optical fiber in the transmission path can be detected by OTDR or COTDR, this approach to system monitoring provides a diagnostic tool that allows the user to examine the fiber between repeaters.

The cost of an undersea optical cable system and other such long haul communication systems is significantly influenced by the number of repeaters. Thus, there is a continuing desire to expand the spacing between repeaters, so as to reduce the number of repeaters. Recently, the maximum possible repeater span has increased from about 50 km to more than 150 km with the introduction of advanced modulation formats like differential phase-shift keying (DPSK) and the increased pump power and two-stage amplification. However measurement capability of OTDR equipment has not improved in step, and is generally still limited to within 90 km. Therefore, about half of the repeater span may be immeasurable. Moreover, high loss loop back (HLLB) paths inside currently available repeaters only allow measuring reflected Rayleigh signals from the outgoing direction, because conventional architectures generally only have one path connecting from one amplifier output of a repeater to the other amplifier output of that repeater. As such, conventional architectures may not be able to measure the Rayleigh signal from the incoming fiber.

DETAILED DESCRIPTION

Various HLLB architectures are disclosed that enable monitoring (e.g., measuring, analyzing, etc) of Rayleigh signals from both inbound and outbound directions of an optical communication system.

As previously explained, there are issues with simply deploying OTDR equipment at each end of the target transmission line, and attempting to measure half of the repeater span from each direction. For instance, HLLB paths inside currently available repeaters only allow measuring a reflected Rayleigh signal from outgoing direction because such repeater architectures generally only have one path connecting from one amplifier output of a repeater to the other amplifier output of that repeater. As such, conventional repeater architectures are not able to measure the Rayleigh signal from the incoming fiber. Thus, OTDR line monitoring equipment can only measure the first half of the repeater span from the output of the repeater, particularly given increased spacing between repeaters.

Figure 1:
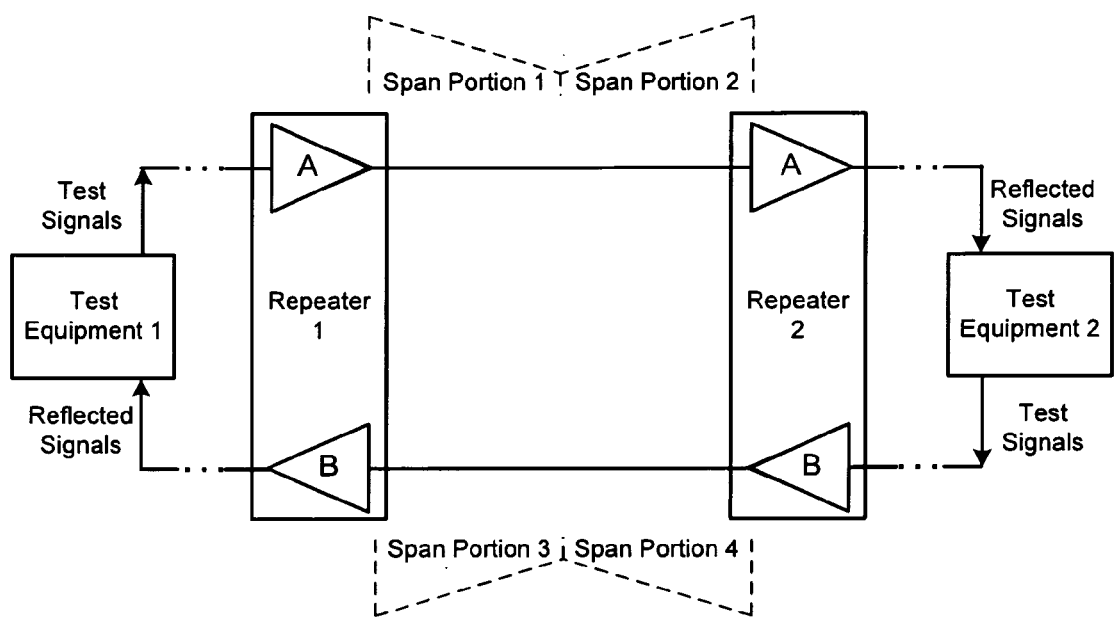
FIG. 1 is a block diagram of an OTDR system for monitoring long repeater spans, configured consistent with an embodiment of the present disclosure.

FIG. 1 is a block diagram of an OTDR system for monitoring repeater spans, configured consistent with an embodiment of the present disclosure. As can be seen, the system has a span that includes two repeaters (repeater 1 and repeater 2) operatively coupled via optical fibers as typically done. Span portions 1, 2, 3, and 4 each represent a portion of the overall span length, and in one particular case, each span portion represents about one half of the distance between the repeaters. One benefit of the architecture of repeaters 1 and 2 is that they can be used to facilitate the monitoring of long repeater spans (in excess of 90 km, in their entirety). As will be appreciated in light of this disclosure, the techniques and architectures described herein may be used with a wide variety of network components and configurations, and a given system may include multiple repeaters, spans of varying lengths, and/or other components such as transceivers at terminals of the system. Embodiments of the present disclosure are not intended to be limited to any particular such componentry and/or configurations.

With further reference to the example system shown in FIG. 1, test signals can be provided to the span by test equipment (test equipment 1 and test equipment 2) deployed at each terminal of the system, and reflected signals can be received back to the respective test equipment. Each of test equipment 1 and test equipment 2 can be implemented with conventional technology, and in one particular embodiment, both are capable of providing test signal wavelengths that exist at the edges of the pass-band of the repeaters, so as to not interfere with actual data signals, particularly if it is desired to carryout testing during system use (so called "in-service mode"), as opposed to testing carried out when no actual data traffic is present (so called "out-service mode"). In general, and as previously explained, reflected signals (e.g., Rayleigh signals) include information that allows the monitoring system to calculate parameters such as loop gain associated with the optical path (including repeaters, high loss loop back paths, fiber and other items in the optical path), or otherwise evaluate the optical path traveled by the test signals. Variation in the loop gain or other relevant parameters may be used to generate an alarm indicating a fault in the system.

From the perspective of test equipment 1, the outgoing fiber includes span portions 1 and 2, and the incoming fiber includes span portions 4 and 3. From the perspective of test equipment 2, the outgoing fiber includes span portions 4 and 3, and the incoming fiber includes span portions 1 and 2. Consistent with an embodiment of the present disclosure, the HLLB architecture allows OTDR test equipment to select a Rayleigh signal reflected from either the outgoing fiber or the incoming fiber by adjusting the optical frequency of the test/probe signal. For instance, test equipment 1 is capable of measuring span portions 1 and 3, and test equipment 2 is capable of measuring span portions 2 and 4. Thus, the total measurement range of the monitoring system covers the whole repeater span in both communication directions. The incoming (or inbound) OTDR can be measured, for example, by in-service mode with very high spatial resolution (~100 m), and the outgoing (or outbound) OTDR can be measured by out-service mode. Multipath interference (MPI) and relative intensity noise (RIN) are comparable to conventional HLLB architectures.

The HLLB architecture configured consistent with principles of the present disclosure can be implemented in a number of ways. FIGS. 2a-b, 3a-e, and 4a-c each show example embodiments of repeaters, which will be discussed in turn. In general, each of these example repeaters exhibits an HLLB architecture that allows monitoring of reflected signals from both inbound and outbound directions of an optical communication system. Other architectures will be apparent in light of this disclosure.

Figure 2A:
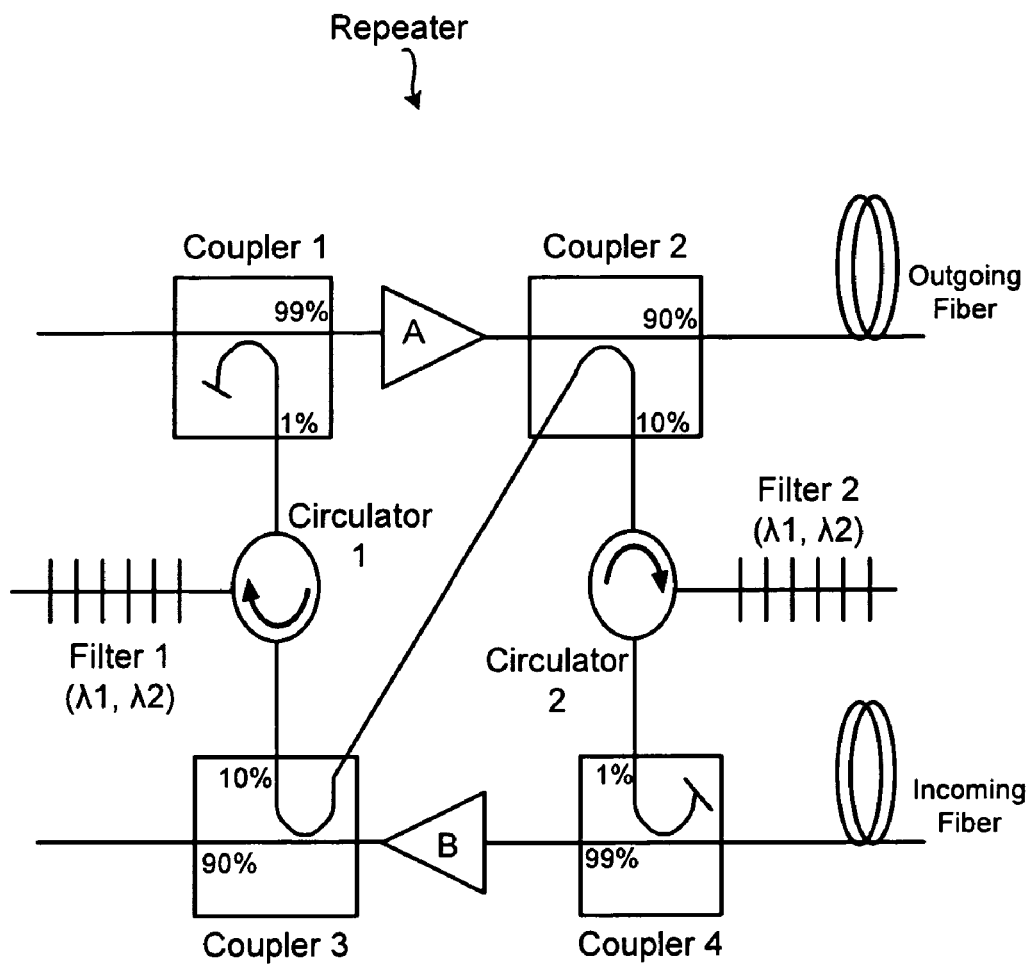
FIG. 2a is a block diagram of a repeater shown in the system of FIG. 1, configured consistent with an embodiment of the present disclosure.

FIG. 2a is a block diagram of a repeater shown in the system of FIG. 1, configured consistent with an embodiment of the present disclosure. As can be seen, the repeater includes an amplifier pair (amplifiers A and B), four optical couplers (couplers 1, 2, 3, and 4), two circulators (circulators 1 and 2), and two wavelength selective filters (filters 1 and 2). A first HLLB path is provided for coupling the output of amplifier A to the input of amplifier B. A second HLLB path is provided for coupling the output of amplifier B to the input of amplifier A. A third HLLB path is provided for coupling the output of amplifier A to the output of amplifier B.

The first HLLB path includes coupler 2, which couples a small percentage (e.g. 1% or 10%) of the total optical power of the signal at the output of amplifier A onto the first HLLB path. The signal coupled onto the first HLLB path by coupler 2 is passed through circulator 2, to filter 2. Filter 2 and circulator 2 effectively operate as a double pass-band filter to pass the signals of desired wavelength from the 10% port of coupler 2 to the 1% port of coupler 4. In this particular example embodiment, filter 2 reflects (or passes) only test signal wavelengths $\lambda 1$ and $\lambda 2$ from test equipment 1. Filter 2 may take any of a variety of known filter configurations, and in one specific embodiment, is implemented with a fiber Bragg grating filter. The wavelengths not reflected (or rejected) by filter 2 are provided to the third HLLB path, as will be discussed in turn. The wavelengths $\lambda 1$ and $\lambda 2$ reflected by filter 2 are passed back to circulator 2 and are coupled to the input of amplifier B by coupler 4, which injects a portion (e.g., 1% or 10%, of the total optical power) thereof into the incoming fiber. When monitoring the incoming fiber (from perspective of test equipment 1), and as will be discussed with reference to FIG. 2b, the test signal wavelengths $\lambda 1$ and $\lambda 2$ from test equipment 1 propagate through the first HLLB path of the repeater (as just described) and down the incoming fiber, and the corresponding reflected Rayleigh signal wavelengths from the incoming fiber are provided back to the test equipment 1 for analysis by way of coupler 4, amplifier B, and coupler 3, so appropriate action (e.g., repair of fiber) can be taken if necessary.

Figure 2B:
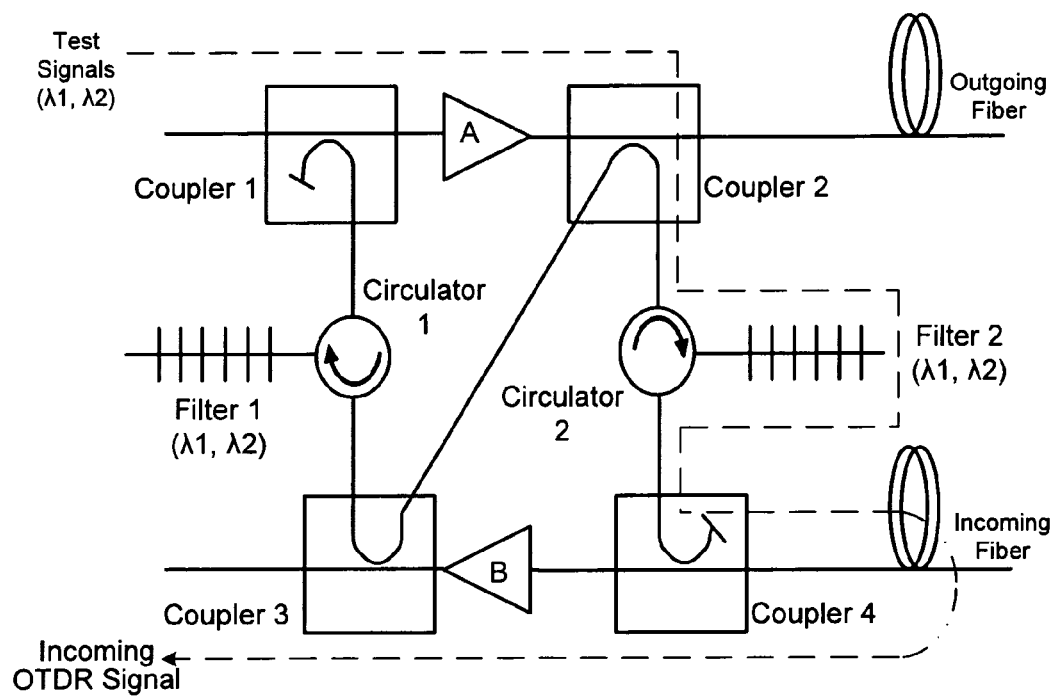
FIG. 2b illustrates the path of a test signal through the repeater of FIG. 2a and the reflected Rayleigh signal from the incoming fiber, consistent with an embodiment of the present disclosure.
Figure 2C:
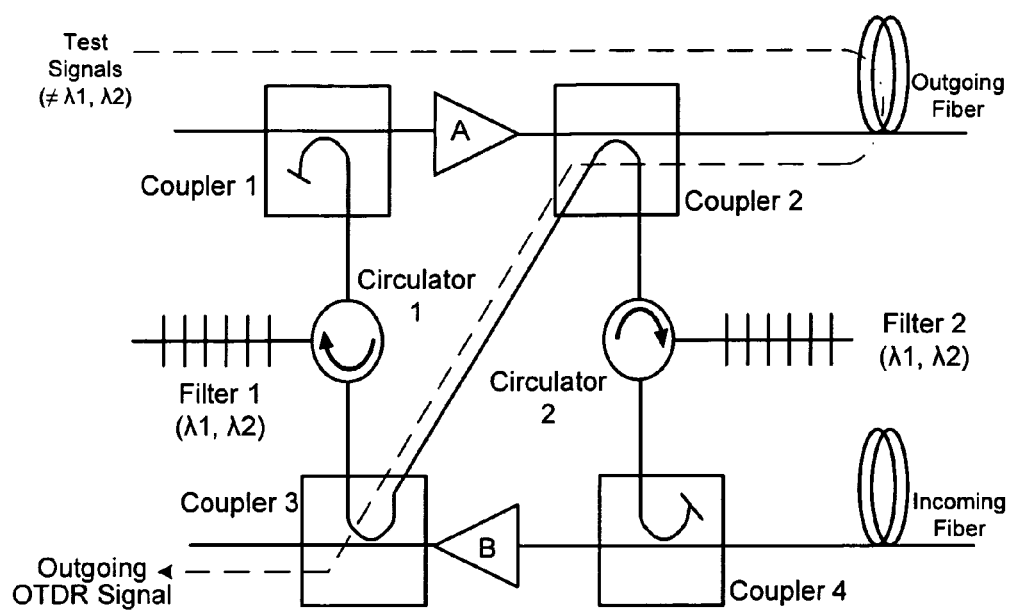
FIG. 2c illustrates the path of a test signal through the repeater of FIG. 2a and the reflected Rayleigh signal from the outgoing fiber, consistent with an embodiment of the present disclosure.

The second HLLB path includes coupler 3, which couples a small percentage (e.g. 1% or 10%) of the total optical power of the signal at the output of amplifier B onto the second HLLB path. The signal coupled onto the second HLLB path by coupler 3 is passed through circulator 1, to filter 1. Filter 1 and circulator 1 operate as a double pass-band filter to pass the signals of desired wavelength from the 10% port of coupler 3 to the 1% port of coupler 1. In this particular example embodiment, filter 1 reflects only test signal wavelengths $\lambda 1$ and $\lambda 2$ from test equipment 2. Filter 1 may take any of a variety of known filter configurations, and in one specific embodiment is implemented as a fiber Bragg grating filter. The wavelengths not reflected by filter 1 are provided to the third HLLB path, as will be discussed in turn. The wavelengths λ1 and λ2 reflected by filter 1 are passed back to circulator 1 and are coupled to the input of amplifier A by coupler 1, which injects a portion (e.g., 1% or 10%, of the total optical power) thereof into the outgoing fiber (as labeled in FIG. 2b). Note that the incoming and outgoing fibers in FIGS. 2a-2c are labeled with respect to test equipment 1. These labels would be reversed with respect test signals propagating to and from test equipment 2. For instance, and with the reversed labels in mind, the test signal wavelengths λ1 and λ2 from test equipment 2 will propagate through coupler 4, amplifier B, and the second HLLB path of the repeater (as just described) and down the incoming fiber, and the corresponding reflected Rayleigh signal wavelengths from the incoming fiber are provided back to the test equipment 2 for analysis (by way of coupler 1, amplifier A, and coupler 2), so appropriate action (e.g., repair of fiber) can be taken if necessary.

The third HLLB path includes coupler 2, which couples a small percentage (e.g., 10% or less) of the total optical power of the signal at the output of amplifier A onto the third HLLB path. In this particular example embodiment, all wavelengths coupled onto the third HLLB path are allowed to pass (i.e., there is no filter on the third HLLB path). The Rayleigh signal coupled onto the third HLLB path by coupler 2 is passed to coupler 3, which couples a small portion (e.g., 10% or less) of the signal on the third HLLB path onto the incoming fiber toward test equipment 1. When monitoring the outgoing fiber (from the perspective of test equipment 1), and as will be discussed with reference to FIG. 2c, the test signal wavelengths (which are set to be not equal to λ1 and λ2) from test equipment 1 propagate down the outgoing fiber, and the corresponding reflected Rayleigh signal wavelengths from the outgoing fiber are provided back to the test equipment 1 by way of the third HLLB path for analysis, so appropriate remedial action can be taken if necessary. Note that the first HLLB path is effectively an open circuit to test signal wavelengths not equal to λ1 and λ2, so that the monitoring process can focus on signal reflected from the outgoing fiber.

As will be appreciated, the third HLLB path operates in a similar fashion when monitoring the outgoing fiber from the perspective of test equipment 2. For instance, the test signal wavelengths (which are set to not equal to λ1 and λ2) from test equipment 2 propagate down the outgoing fiber through coupler 4, amplifier B, and coupler 3. The corresponding reflected Rayleigh signal wavelengths from the outgoing fiber are provided back to the test equipment 2 by way of the third HLLB path for analysis, so appropriate remedial action can be taken if necessary. Just as with the first HLLB path, the second HLLB path also is effectively an open circuit to test signal wavelengths not equal to λ1 and λ2, so that the monitoring process can focus on signal reflected from the outgoing fiber. Note that this description is from the perspective of test equipment 2 and swaps the outgoing fiber and incoming fiber labels shown in FIG. 2c.

FIG. 2b illustrates the path of a test signal through the repeater of FIG. 2a and the reflected Rayleigh signal from the incoming fiber (from the perspective of test equipment 1), consistent with an embodiment of the present disclosure. To measure the Rayleigh signal reflected from the incoming fiber, the test signal wavelength (or wavelengths) generated by test equipment 1 is selected as the center frequency (or pass band) of filter 2 (e.g., λ1 and λ2, in this particular embodiment). The test signal is thus coupled from the output of the amplifier A to the incoming fiber through the 10% port of coupler 2, circulator 2, filter 2, the 1% port of coupler 4, and into the incoming fiber, as indicated with the dashed line in FIG. 2b. The reflected Rayleigh signals from the incoming fiber are amplified by amplifier B, and provided back to test equipment 1 via coupler 3. These reflected Rayleigh signals are designated incoming OTDR signal in FIG. 2b.

For a 150 km repeater span, and consistent with one particular embodiment of the present disclosure, the received Rayleigh signals from the incoming fiber acquire about 30 dB of repeater amplification and 30 dB of attenuation due to passing through both 10% port of coupler 2 and the 1% port of coupler 4. Therefore, the effective attenuation is 0 dB. On the other hand, the reflected Rayleigh signals from the outgoing fiber have an attenuation of 20 dB (due to passing through both 10% port of coupler 2 and the 10% port of coupler 3), and thus can be neglected.

FIG. 2c illustrates the path of a test signal through the repeater of FIG. 2a and the reflected Rayleigh signal from the outgoing fiber (from the perspective of test equipment 1), consistent with an embodiment of the present disclosure. To measure the Rayleigh signal reflected from the outgoing fiber, the test signal wavelength (or wavelengths) generated by test equipment 1 is selected different from the wavelength (or pass band) of the wavelength selective filter 2 (i.e., λ≠λ1 and λ2). In the example embodiment shown, the returned Rayleigh signal passes through two 10% coupler ports (coupler 2 and coupler 3), which provides about 20 dB attenuation. These reflected Rayleigh signals are designated outgoing OTDR signal in FIG. 2c.

In the example embodiment shown in FIGS. 2a-2c, couplers 1 and 4 are each implemented with a 99%-to-1% (20 dB) coupler at the respective inputs of the repeater, and couplers 2 and 3 are each implemented with a 90%-to-10% (10 dB) coupler at the respective outputs of the repeater. The selection of 1% coupler at the input of the repeater is to minimize noise figure penalty due to added optical component; otherwise a 10% or higher coupler at the input of the repeater may cause about 0.4 dB additional insertion loss. Thus, couplers 1 and 4 can be selected accordingly, depending on system demands. In addition, note that circulators 1 and 2, couplers 1, 2, 3, and 4, and amplifiers A and B can be implemented with conventional technology, and operatively coupled using fiber and connection techniques suitable for the application at hand, given particulars such as operating wavelength range, power levels, length of span between repeaters, etc.

Figure 3A:
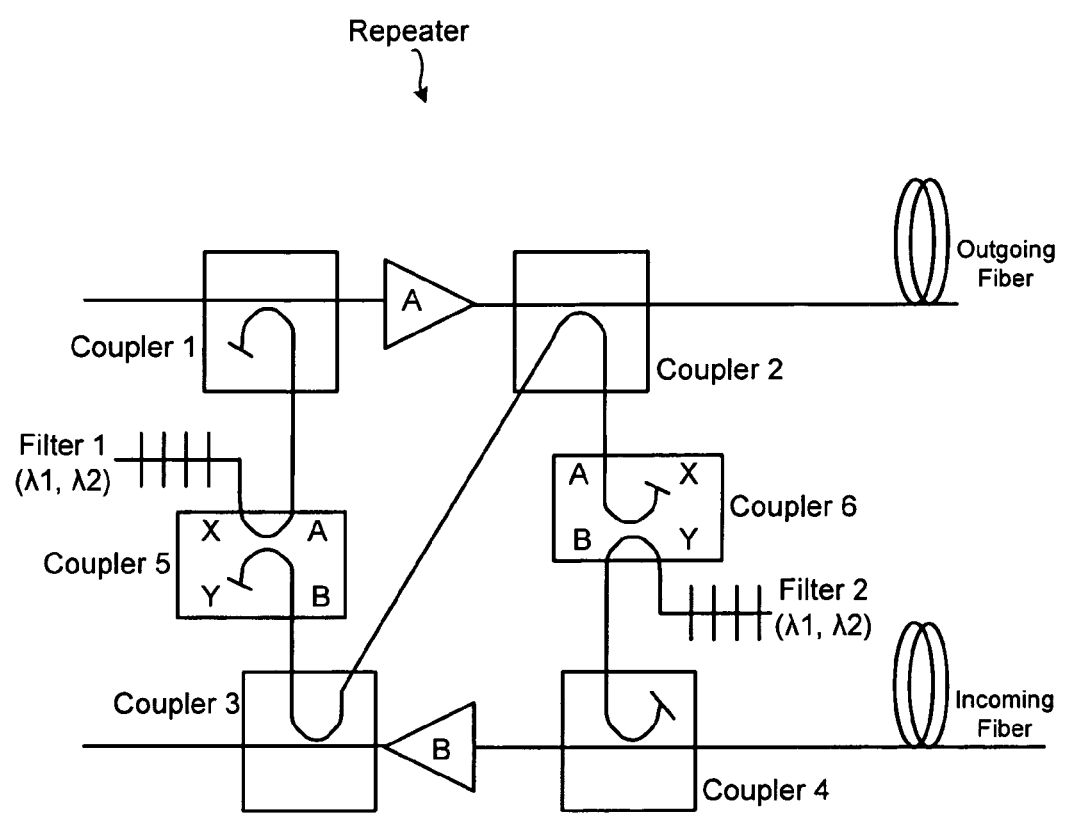
FIG. 3a is a block diagram of a repeater shown in the system of FIG. 1, configured consistent with another embodiment of the present disclosure.

FIG. 3a is a block diagram of a repeater shown in the system of FIG. 1, configured consistent with another embodiment of the present disclosure. As can be seen, the repeater includes an amplifier pair (amplifiers A and B), six optical couplers (couplers 1, 2, 3, 4, 5, and 6), and two wavelength selective filters (filters 1 and 2). A first HLLB path is provided for coupling the output of amplifier A to the input of amplifier B. A second HLLB path is provided for coupling the output of amplifier B to the input of amplifier A. A third HLLB path is provided for coupling the output of amplifier A to the output of amplifier B.

In general, the HLLB architecture of FIG. 3a is similar to that of FIG. 2a, except that the circulators 1 and 2 of FIG. 2a have each been replaced by a coupler (couplers 5 and 6). In one specific embodiment, couplers 5 and 6 are implemented with a 30/70 coupler having the following transmission loss characteristics: between ports A and X has 1.5 dB loss (70%); between ports A and Y has 5.2 dB loss (30%); between ports B and X has 5.2 dB loss (30%); and between ports B and Y has 1.5 dB loss (70%). Thus, the first HLLB path includes coupler 2, which couples a small percentage (e.g. 1% or 10%) of the total optical power of the signal at the output of amplifier A onto the first HLLB path. The signal coupled onto the first HLLB path by coupler 2 is passed to port A to out port Y of coupler 6, and to filter 2. Filter 2 and coupler 6 effectively operate as a double pass-band filter to pass the signals of desired wavelength from the 10% port of coupler 2 to the 1% port of coupler 4. The wavelengths λ1 and λ2 reflected by filter 2 are passed back to port Y of coupler 6 and output at port B of coupler 6, and coupled to the input of amplifier B by coupler 4. The previous discussion with reference to FIGS. 2a-2c with respect to commonalities between the two architectures and signal flows shown in FIGS. 2a-c and 3a-c is equally applicable here.

Figure 3B:
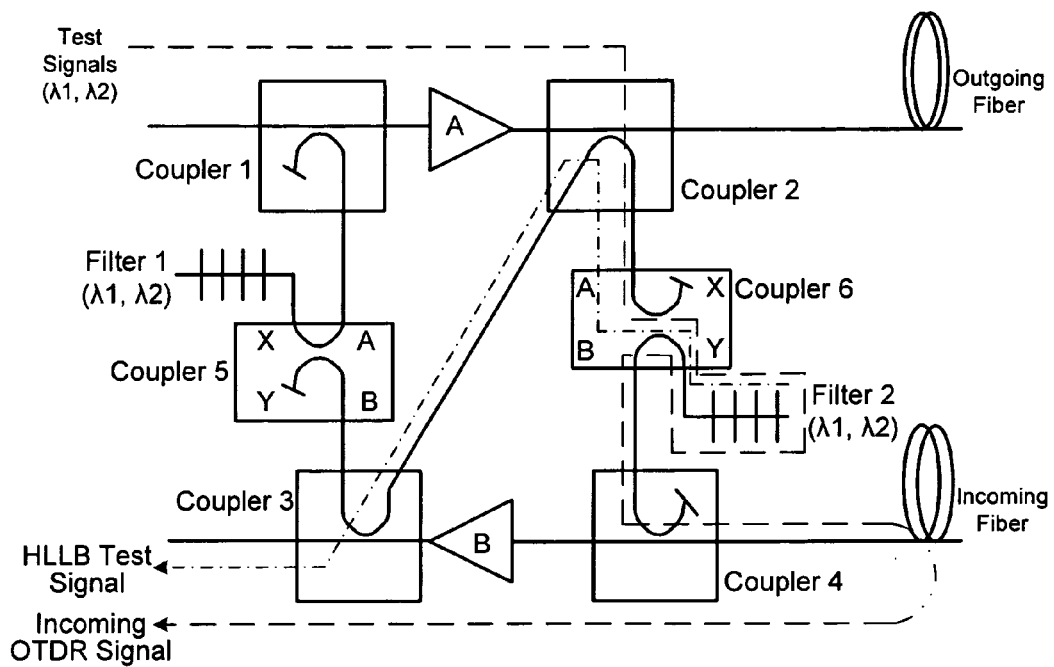
FIG. 3b illustrates the path of a test signal through the repeater of FIG. 3a and the reflected Rayleigh signal from the incoming fiber, as well as the path of an HLLB test signal, consistent with an embodiment of the present disclosure.
Figure 3C:
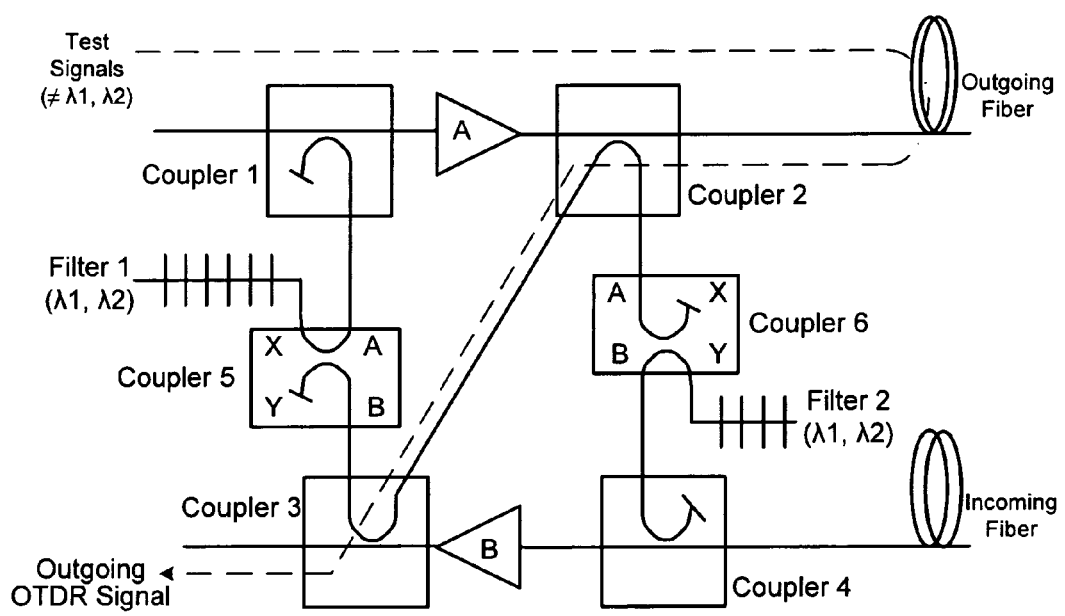
FIG. 3c illustrates the path of a test signal through the repeater of FIG. 3a and the reflected Rayleigh signal from the outgoing fiber, consistent with an embodiment of the present disclosure.

When monitoring the incoming fiber (from perspective of test equipment 1), and with reference to FIG. 3b, the test signal wavelengths λ1 and λ2 from test equipment 1 propagate through the first HLLB path of the repeater (as just described) and down the incoming fiber, and the corresponding reflected Rayleigh signal wavelengths from the incoming fiber are provided back to the test equipment 1 for analysis by way of coupler 4, amplifier B, and coupler 3, so appropriate remedial action can be taken if necessary. These reflected Rayleigh signals are designated incoming OTDR signal in FIG. 3b. One additional benefit associated with using couplers 5 and 6 as shown in FIGS. 3a-c has to do with providing an HLLB test signal in addition to the incoming OTDR signal. In more detail, and with reference to FIG. 3b, the HLLB test signal (shown as the dashed-dotted line) is reflected by filter 2 and into port Y of coupler 6. This HLLB test signal is output at port A of coupler 6 and provided to the 10% port of coupler 2, and to the third HLLB path (as previously described), and then back to test equipment 1. This HLLB test signal can be used in a similar fashion as the OTDR test signals in diagnosing problems or potential problems associated with the HLLB architecture. When monitoring the outgoing fiber (from the perspective of test equipment 1), and with reference to FIG. 3c, the test signal wavelengths from test equipment 1, which are set to be not equal to λ1 and λ2, propagate down the outgoing fiber, and the corresponding reflected Rayleigh signal wavelengths from the outgoing fiber are provided back to the test equipment 1 by way of the third HLLB path for analysis, so appropriate action can be taken if necessary.

As previously noted with respect to FIGS. 2a-2c, the incoming and outgoing fibers in FIGS. 3a-3c are labeled with respect to test equipment 1. These labels would be reversed with respect test signals propagating to and from test equipment 2. In addition, signal flows would be comparable to those previously described with respect to test equipment 1, but be in the opposite direction.

Figure 3D:
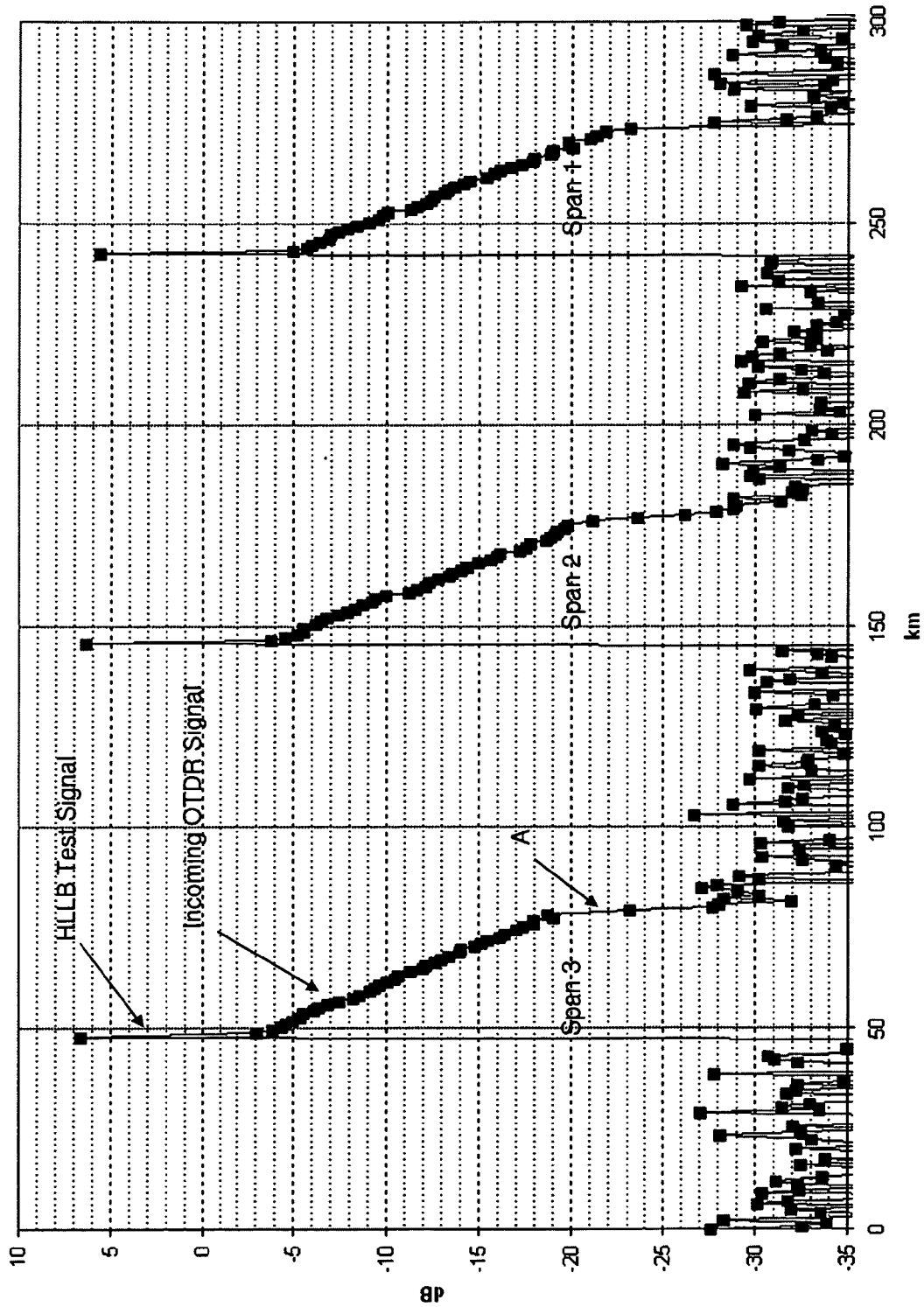
FIG. 3d illustrates an example measured reflected Rayleigh signal from the incoming fiber and an example HLLB test signal, consistent with an embodiment of the present disclosure.
Figure 3E:
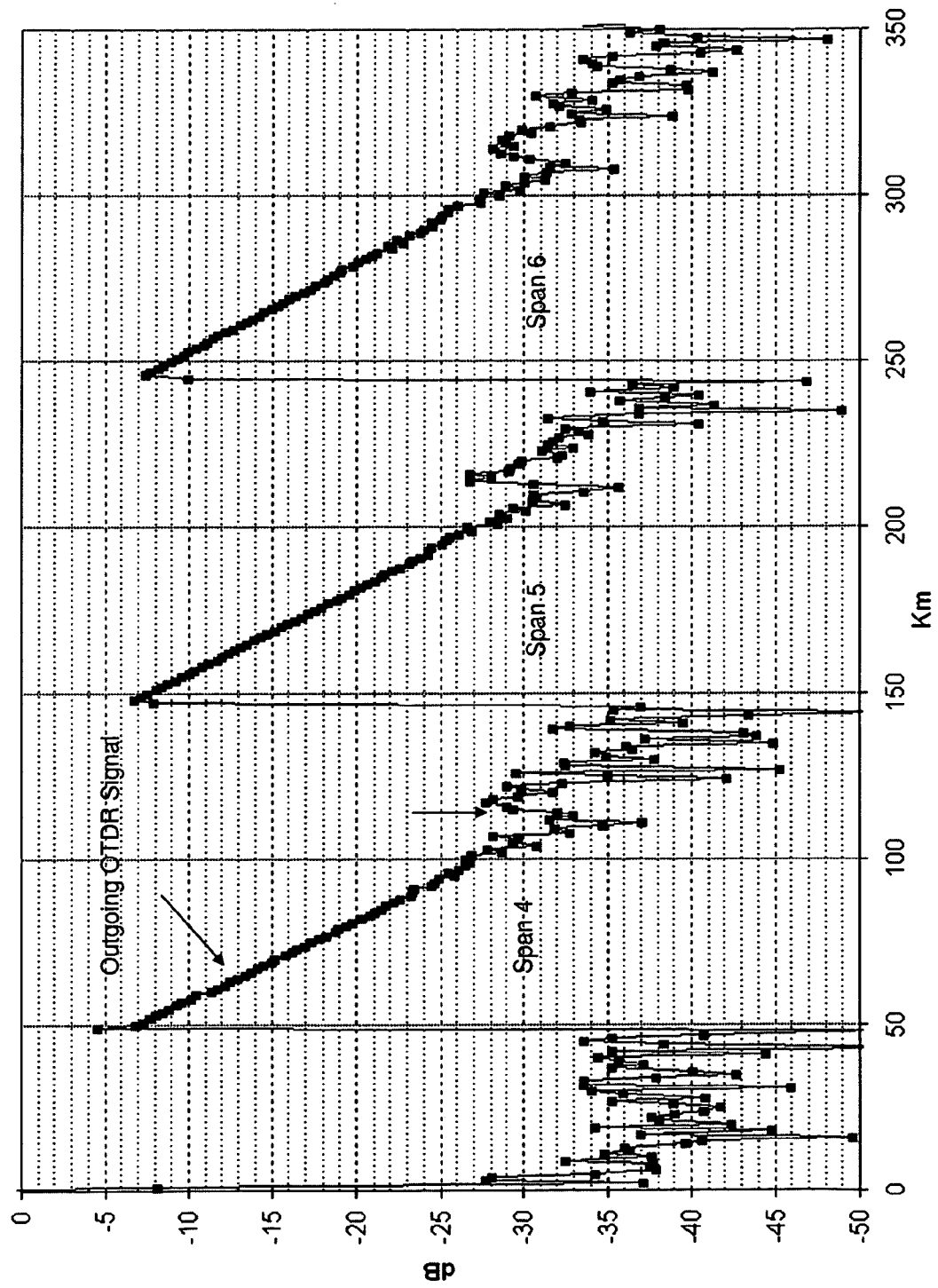
FIG. 3e illustrates an example measured reflected Rayleigh signal from the outgoing fiber, consistent with an embodiment of the present disclosure.

FIGS. 3d and 3e collectively show the monitoring results of incoming and outgoing fibers, respectively, of a system having six spans. Spans 1, 2, and 3 are monitored by virtue of the incoming OTDR signal, and Spans 4, 5, and 6 are monitored by virtue of the outgoing OTDR signal. In more detail, FIG. 3d illustrates an example measured reflected Rayleigh signal from the incoming fiber (including spans 1, 2, and 3) and an example HLLB test signal, consistent with an embodiment of the present disclosure. The test signal frequency is set to the filter frequency (filters 1 and 2) as previously discussed, so as to allow the corresponding test equipment to measure the incoming OTDR signal and the HLLB test signal shown in FIG. 3d. In this particular example, point A noted on the measurement plot of Span 3 indicates a mode mismatch between negative dispersion fibers (IDF) (~30 um$^2$) and positive dispersion fibers (SLA) (100 um$^2$), which causes a significant drop of reflected signal power. FIG. 3e illustrates an example measured reflected Rayleigh signal from the outgoing fiber (including spans 4, 5, and 6), consistent with an embodiment of the present disclosure. In this case, the signal frequency is set to a frequency other than the filter frequency (filters 1 and 2) as previously discussed, so as to allow the corresponding test equipment to measure outgoing OTDR signal shown in FIG. 3e.

Figure 4A:
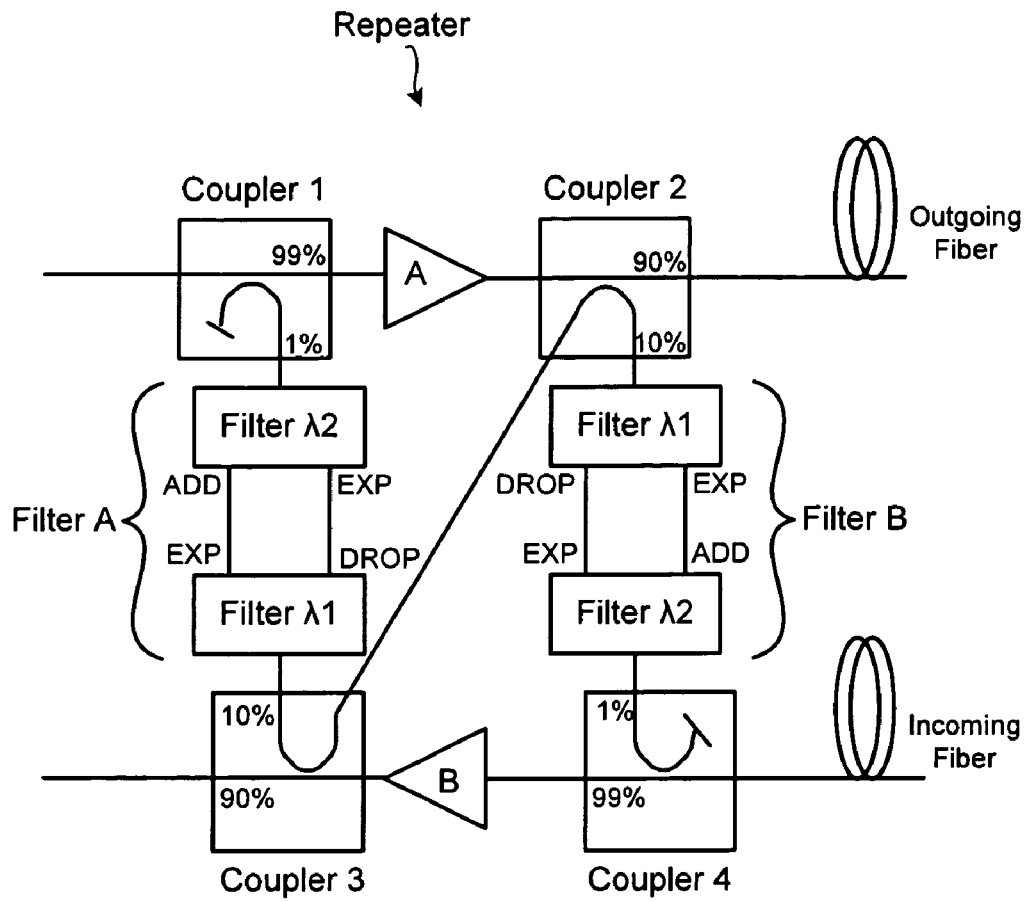
FIG. 4a is a block diagram of a repeater shown in the system of FIG. 1, configured consistent with another embodiment of the present disclosure.

FIG. 4a is a block diagram of a repeater shown in the system of FIG. 1, configured consistent with another embodiment of the present disclosure. As can be seen, the repeater includes an amplifier pair (amplifiers A and B), four optical couplers (couplers 1, 2, 3, and 4), and two dual wavelength optical filters (filters A and B). A first HLLB path is provided for coupling the output of amplifier A to the input of amplifier B. A second HLLB path is provided for coupling the output of amplifier B to the input of amplifier A. A third HLLB path is provided for coupling the output of amplifier A to the output of amplifier B.

Figure 4B:
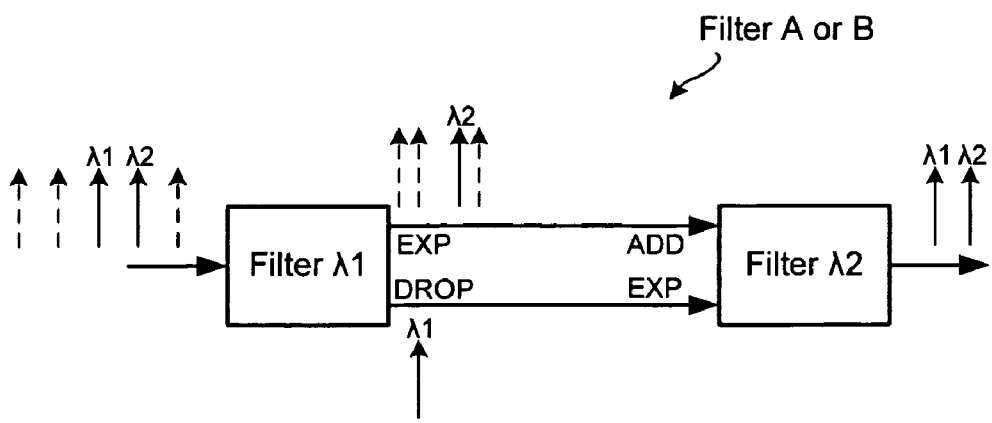
FIG. 4b illustrates example signal flow through the dual wavelength optical filters included in the repeater of FIG. 4a, consistent with an embodiment of the present disclosure.
Figure 4C:
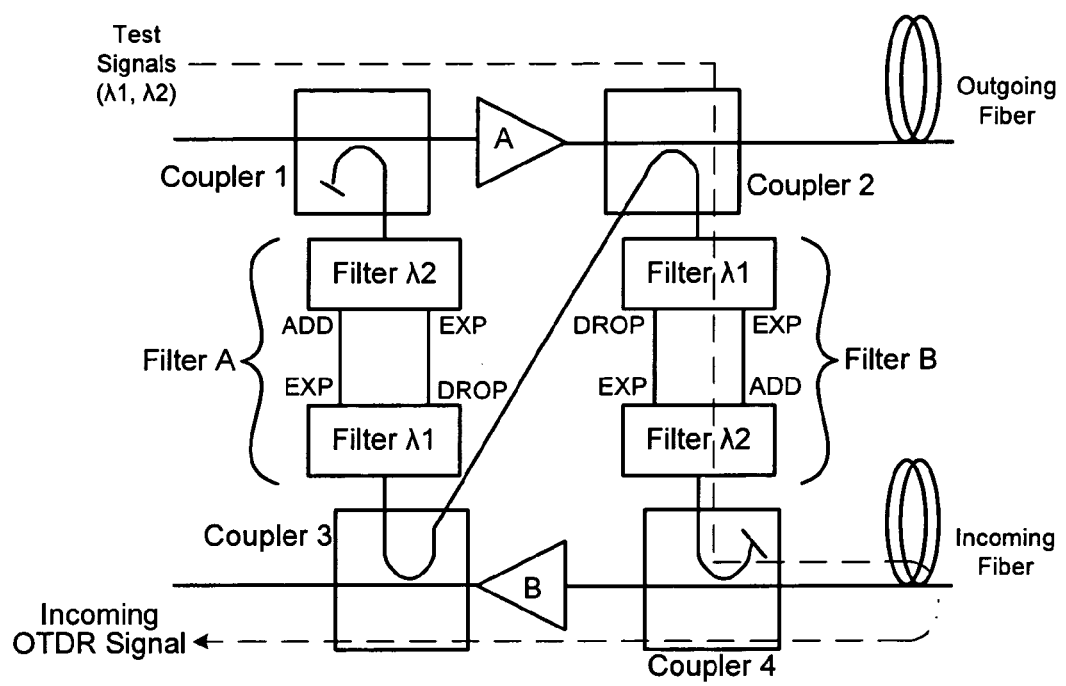
FIG. 4c illustrates the path of a test signal through the repeater of FIG. 4a and the reflected Rayleigh signal from the incoming fiber, consistent with an embodiment of the present disclosure.
Figure 4D:
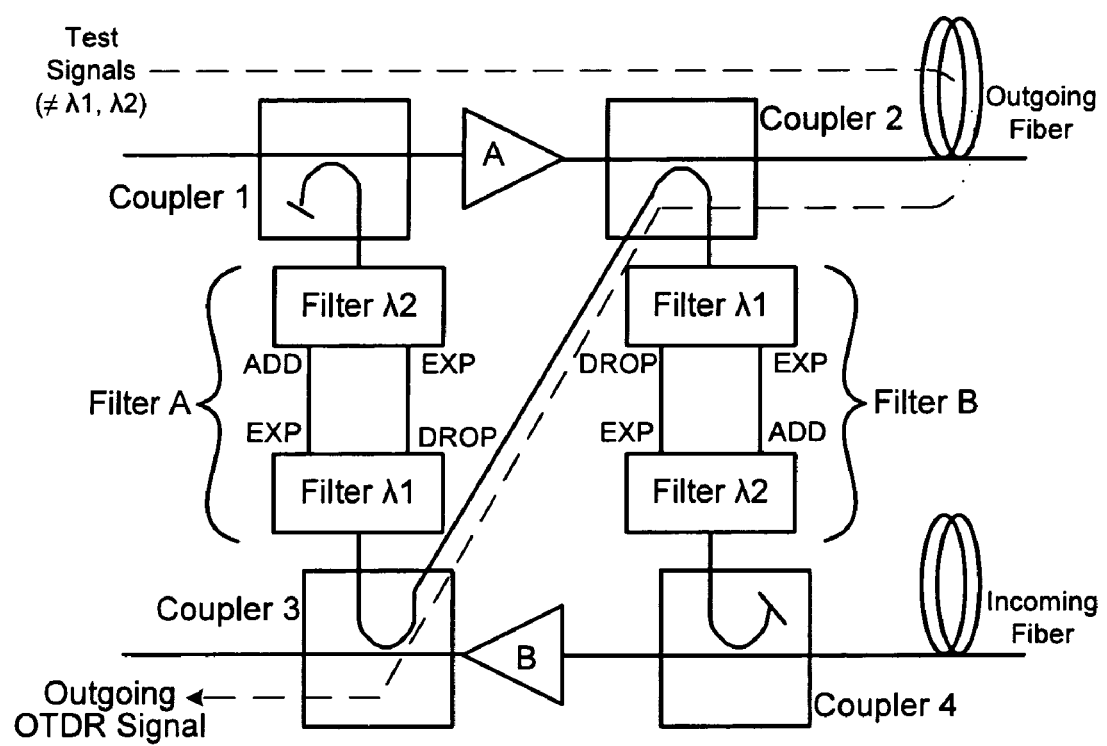
FIG. 4d illustrates the path of a test signal through the repeater of FIG. 4a and the reflected Rayleigh signal from the outgoing fiber, consistent with an embodiment of the present disclosure.

In general, the HLLB architecture of FIG. 4a is similar to that of FIG. 2a, except that the filters 1 and 2 and circulators 1 and 2 of FIG. 2a have each been replaced by a dual wavelength optical filter (filters A and B). In one specific such embodiment, filters A and B are each implemented with two cascaded 3-port thin film DWDM filters (filter λ1 and filter λ2), although numerous comparable filter configurations will be apparent in light of this disclosure. Details of signal flow through each filter A and B are shown in FIG. 4b. As can be seen, an aggregate of signals are provided to the input of filter λ1 from the 10% port of coupler 2 (for filter B) or the 10% port of coupler 3 (for filter A). This aggregate of signals may include a number of wavelengths, including λ1 and λ2. The EXP port of Filter λ1 is a null-filter which passes all signals except λ1. The Drop port of filter λ1 is a signal wavelength filter which only passes λ1. Thus, the Add port of filter λ2 receives a plurality of wavelengths including λ2 (but not λ1), and the Exp port of filter λ2 receives λ1 only. The output of filter λ2 is λ1 and λ2. Note that the transmit direction can also be reversed so that a signal wavelength is dropped from the DROP port and the rest of multiple wavelength signals are passed from the EXP port. By cascading two 3-port filters as illustrated in FIGS. 4a-4d, a double pass-band optical filter is realized. The previous discussion with reference to FIGS. 2a-2c with respect to commonalities between the two architectures and signal flows shown in FIGS. 2a-c and 4a-d is equally applicable here.

Figure 5:
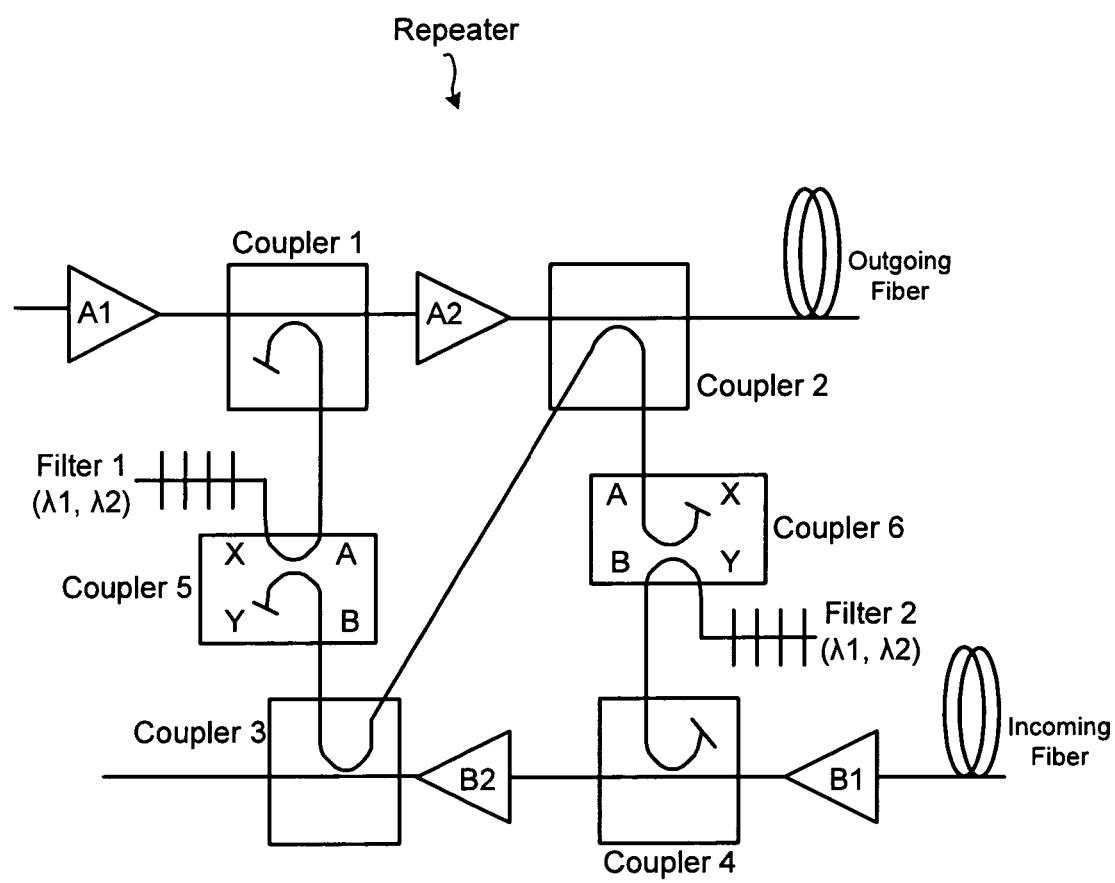
FIG. 5 is a block diagram of a dual-stage repeater configured consistent with an embodiment of the present disclosure.

As discussed in the previously explained, the amplifiers A and B can be implemented with conventional technology, and in one particular embodiment, are implemented with one or more erbium doped fiber amplifiers (EDFAs) or other rare earth doped fiber amplifiers, Raman amplifiers or semiconductor optical amplifiers. In addition, and as will be appreciated in light of this disclosure, embodiments of the present disclosure can be used with single stage repeaters as well as dual-stage repeaters. For instance, FIG. 5 shows a block diagram of a dual-stage repeater configured consistent with an embodiment of the present disclosure. As can be seen, this example dual-stage configuration is similar to the architecture shown in FIG. 3a, but further includes amplifiers A1 and B1, which make up the first stage of the repeater. The second stage is provided by amplifiers A2 and B2, respectively. Note that the selective coupling and/or filtering between couplers 2 and 4, and couplers 3 and 1 shown in FIG. 5 can be implemented with any number of components and architectures as described herein, such as those shown in FIGS. 2a and 4a.

For purposes of simplicity, the amplifiers depicted in the various figures (e.g., A, B, A1, A2, B1, and B2) have been abstracted. In practice, and as will be appreciated, the amplification stages can be implemented as typically done using, for example, an erbium doped fiber and laser pump configuration. In addition and with reference to dual-stage configurations, other componentry that operatively couple amplifier stages, such as noise filtering (e.g., ASE filter), isolators, and gain flattening filters, are not shown, but can be implemented as typically done. In addition, and with respect to the first, second and third HLLB paths coupling signals from one fiber to the other, note that the "output" of an amplifier generally refers to the output of the amplifier itself for single-stage embodiments, or the output of the second stage amplifier for dual-stage embodiments. Likewise, the "input" of an amplifier generally refers to the input of the amplifier itself for single-stage embodiments, or the output of the first stage amplifier for dual-stage embodiments.

Thus, and consistent with the discussion provided herein, one embodiment of the present disclosure provides a repeater for an optical communication system. The repeater includes a first amplifier having an input and an output and for amplifying optical signals, and a second amplifier having an input and an output and for amplifying optical signals. These first and second amplifiers can each be configured, for example, as single-stage or dual-stage amplifiers. A first high loss loop back (HLLB) path for coupling the output of the first amplifier to the input of the second amplifier. A second HLLB path for coupling the output of the second amplifier to the input of the first amplifier. A third HLLB path is provided for coupling the output of the first amplifier to the output of the second amplifier. In one such case, the repeater is associated with a span having a length in excess of 90 km and capable of bi-directional communication, and the entire span can be monitored based on reflected signals corresponding to test signals applied from both communication directions. In one such case, the test signals and their corresponding reflected signals are optical time domain reflectometry (OTDR) signals. In another particular case, the repeater is capable of operatively coupling to an incoming fiber and an outgoing fiber relative to a given direction of communication. Each of the first HLLB path and the second HLLB path includes a selective filter for passing only signals of desired wavelength, a first optical coupler for coupling a percentage of total optical power of a signal from the outgoing fiber to an input of the selective filter, and a second optical coupler for coupling a percentage of the signal passed by the selective filter to the incoming fiber. In one such case, at least a portion of signals not passed by the selective filter is coupled to the third HLLB path by the first optical coupler. Here, at least a portion of signals coupled to the third HLLB path by the first optical coupler may be coupled to the output of the second amplifier. The selective filter may include a number of selective filtering means, such as a circulator operatively coupled to a Bragg grating filter, or a coupler operatively coupled to a Bragg grating filter, or a dual wavelength optical filter (e.g., two cascaded 3-port DWDM filters). In another particular case, the repeater is capable of operatively coupling to an incoming fiber and an outgoing fiber relative to an applied test signal in a wavelength range that is passable by the first HLLB path, and a percentage of the test signal is coupled from the outgoing fiber to the incoming fiber by the first HLLB path, and corresponding reflected signals from the incoming fiber are available for evaluating the incoming fiber. In one such case, at least a portion of the test signal coupled from the outgoing fiber to the incoming fiber by the first HLLB path is passed from the first HLLB path to the third HLLB path, to provide an HLLB test signal. In another particular case, the repeater is capable of operatively coupling to an incoming fiber and an outgoing fiber relative to an applied test signal in a wavelength range that is not passable by the first HLLB path, and a percentage of reflected signals corresponding to the test signal is coupled from the outgoing fiber to the incoming fiber by the third HLLB path, and at least a percentage of those reflected signals are available for evaluating the outgoing fiber. Numerous combinations of such functionality and architecture and other variations and features described herein will be apparent in light of this disclosure.

For instance, another embodiment of the present disclosure provides an optical communication system. The system includes first and second repeaters operatively coupled to provide a repeater span. Each repeater may be configured as described above. The system further includes a first line monitoring equipment operatively coupled to the first repeater, and a second line monitoring equipment operatively coupled to the second repeater. The entire repeater span can be monitored based on reflected signals corresponding to test signals applied from at least one of the first and second line monitoring equipment. In one such case, the repeater span has a length in excess of 90 km, and the entire span can be monitored based on reflected signals corresponding to optical time domain reflectometry (OTDR) test signals applied from both the first and second line monitoring equipment.

The embodiments that have been described herein but some of the several which utilize this disclosure and are set forth here by way of illustration but not of limitation. Many other embodiments, which will be readily apparent to those of ordinary skill in the art, may be made without departing materially from the spirit and scope of the disclosure. In addition, the term "coupled" or "operatively coupled" as used herein refers to any connection, coupling, link or the like by which signals carried by one system element are imparted to the "coupled" element or elements. Such "coupled" devices are not necessarily directly connected to one another and may be separated by intermediate components or devices that may manipulate or modify such signals.

What is claimed is:

1. A repeater for an optical communication system configured to transmit test signals and to monitor corresponding reflected test signals from both inbound and outbound directions, the repeater comprising:
   a first amplifier having an input and an output, and for amplifying optical signals;
   a second amplifier having an input and an output, and for amplifying optical signals;
   a first high loss loop back (HLLB) path for coupling the output of the first amplifier to the input of the second amplifier, wherein the first HLLB path is configured to pass at least one test signal in a wavelength range and configured to reject wavelengths outside of the wavelength range;
   a second HLLB path for coupling the output of the second amplifier to the input of the first amplifier, wherein the second HLLB path is configured to pass at least one test signal in a wavelength range and configured to reject wavelengths outside of the wavelength range; and
   a third HLLB path for coupling the output of the first amplifier to the output of the second amplifier, wherein the third HLLB path is configured to pass a plurality of wavelengths from the output of the first amplifier to the output of the second amplifier, wherein the wavelengths passed by the third HLLB path include wavelengths in the wavelength range and at least one reflected test signal outside of the wavelength range.

2. The repeater of claim 1 wherein the reflected test signals include Rayleigh signals from both inbound and outbound directions of the optical communication system.

3. The repeater of claim 1 wherein the repeater is associated with a span having a length in excess of 90 km and configured for bi-directional communication, and wherein the first, second, and third HLLB paths are configured to pass the test signals and the reflected test signals for monitoring an entire extent of the span based on the reflected signals corresponding to the test signals applied from both communication directions.

4. The repeater of claim 3 wherein the test signals and their corresponding reflected signals are optical time domain reflectometry (OTDR) signals.

5. The repeater of claim 1 wherein the repeater is configured for operatively coupling to an incoming fiber and an outgoing fiber relative to a given direction of communication, and each of the first HLLB path and the second HLLB path comprises:
- a selective filter, for passing only signals in the wavelength range;
- a first optical coupler for coupling a percentage of total optical power of a signal from the outgoing fiber to an input of the selective filter; and
- a second optical coupler for coupling a percentage of the signal passed by the selective filter to the incoming fiber.

6. The repeater of claim 5 wherein at least a portion of signals not passed by the selective filter is coupled to the third HLLB path by the first optical coupler.

7. The repeater of claim 6 wherein at least a portion of signals coupled to the third HLLB path by the first optical coupler is coupled to the output of the second amplifier.

8. The repeater of claim 5 wherein the selective filter comprises:
- a circulator operatively coupled to a Bragg grating filter.

9. The repeater of claim 5 wherein the selective filter comprises:
- a coupler operatively coupled to a Bragg grating filter.

10. The repeater of claim 5 wherein the selective filter comprises:
- a dual wavelength optical filter.

11. The repeater of claim 10 wherein the dual wavelength optical filter includes two cascaded 3-port DWDM filters.

12. The repeater of claim 1 wherein the repeater is configured for operatively coupling to an incoming fiber and an outgoing fiber, and a percentage of the test signal is coupled from the outgoing fiber to the incoming fiber by the first HLLB path, and corresponding reflected signals from the incoming fiber are provided for evaluating the incoming fiber.

13. The repeater of claim 12 wherein at least a portion of the test signal coupled from the outgoing fiber to the incoming fiber by the first HLLB path is passed from the first HLLB path to the third HLLB path, to provide an HLLB test signal.

14. The repeater of claim 1 wherein the repeater is configured for operatively coupling to an incoming fiber and an outgoing fiber, and a percentage of reflected signals corresponding to the test signal is coupled from the outgoing fiber to the incoming fiber by the third HLLB path, and at least a percentage of those reflected signals are provided for evaluating the outgoing fiber.

15. A repeater for an optical communication system, the repeater comprising:
- a first amplifier having an input and an output, and for amplifying optical signals;
- a second amplifier having an input and an output, and for amplifying optical signals;
- a first high loss loop back (HLLB) path for coupling the output of the first amplifier to the input of the second amplifier, wherein the first HLLB path is configured to pass at least one test signal in a wavelength range and configured to reject wavelengths outside of the wavelength range;
- a second HLLB path for coupling the output of the second amplifier to the input of the first amplifier, wherein the second HLLB path is configured to pass at least one test signal in a wavelength range and configured to reject wavelengths outside of the wavelength range; and
- a third HLLB path is provided for coupling the output of the first amplifier to the output of the second amplifier, wherein the third HLLB path is configured to pass a plurality of wavelengths from the output of the first amplifier to the output of the second amplifier, wherein the wavelengths passed by the third HLLB path include wavelengths in the wavelength range and at least one reflected test signal outside of the wavelength range;

wherein the repeater is configured for operatively coupling to an incoming fiber and an outgoing fiber relative to a first applied test signal in a wavelength range that is passable by the first HLLB path, and a percentage of the first test signal is coupled from the outgoing fiber to the incoming fiber by the first HLLB path, and corresponding reflected signals from the incoming fiber are provided for evaluating the incoming fiber;

wherein at least a portion of the first test signal from the first HLLB path is passed from the first HLLB path to the third HLLB path, to provide an HLLB test signal;

wherein a percentage of reflected signals corresponding to a second applied test signal in a wavelength range that is not passable by the first HLLB path is coupled from the outgoing fiber to the incoming fiber by the third HLLB path, and at least a percentage of those reflected signals are provided for evaluating the outgoing fiber.

16. The repeater of claim 15 wherein the repeater is associated with a span having a length in excess of 90 km and configured for bi-directional communication, and wherein the first, second, and third HLLB paths are configured to pass the test signals and the reflected test signals for monitoring an entire extent of the span based on the reflected signals corresponding to the test signals applied from both communication directions.

17. The repeater of claim 16 wherein each of the first and second applied test signals and their corresponding reflected signals are optical time domain reflectometry (OTDR) signals.

18. The repeater of claim 15 wherein each of the first HLLB path and the second HLLB path comprises:
- a selective filter, for passing only signals in the wavelength range;
- a first optical coupler for coupling a percentage of total optical power of a signal from the outgoing fiber to an input of the selective filter; and
- a second optical coupler for coupling a percentage of the signal passed by the selective filter to the incoming fiber.

19. An optical communication system, comprising:
first and second repeaters operatively coupled to provide a repeater span, each repeater comprising:
- a first amplifier having an input and an output, and for amplifying optical signals;
- a second amplifier having an input and an output, and for amplifying optical signals;
- a first high loss loop back (HLLB) path for coupling the output of the first amplifier to the input of the second amplifier, wherein the first HLLB path is configured to pass at least one test signal in a wavelength range and configured to reject wavelengths outside of the wavelength range;
- a second HLLB path for coupling the output of the second amplifier to the input of the first amplifier, wherein the second HLLB path is configured to pass at least one test signal in a wavelength range and configured to reject wavelengths outside of the wavelength range; and a third HLLB path is provided for coupling the output of the first amplifier to the output of the second amplifier, wherein the third HLLB path is configured to pass a plurality of wavelengths from the output of the first amplifier to the output of the second amplifier, wherein the wavelengths passed by the third HLLB path include wavelengths in the wavelength range and at least one reflected test signal outside of the wavelength range;

a first line monitoring equipment operatively coupled to the first repeater; and a second line monitoring equipment operatively coupled to the second repeater;

wherein the first and second line monitoring equipment are configured to monitor an entire extent of the repeater span based on reflected signals corresponding to test signals applied from at least one of the first and second line monitoring equipment.

20. The system of claim 19 wherein the repeater span has a length in excess of 90 km, and the reflected signals correspond to optical time domain reflectometry (OTDR) test signals applied from both the first and second line monitoring equipment.

* * * * *